March 28, 1939.  O. E. WOLFF  2,152,518
MOTION TRANSLATING MECHANISM
Filed Dec. 20, 1937
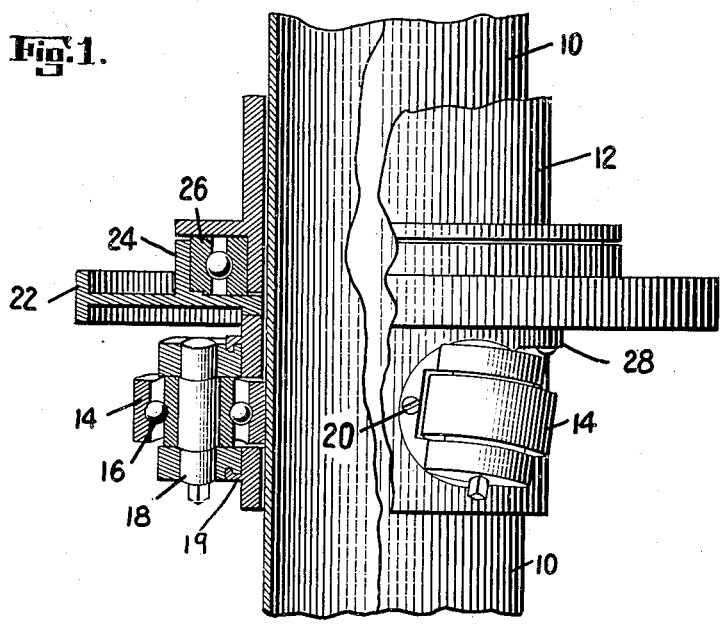
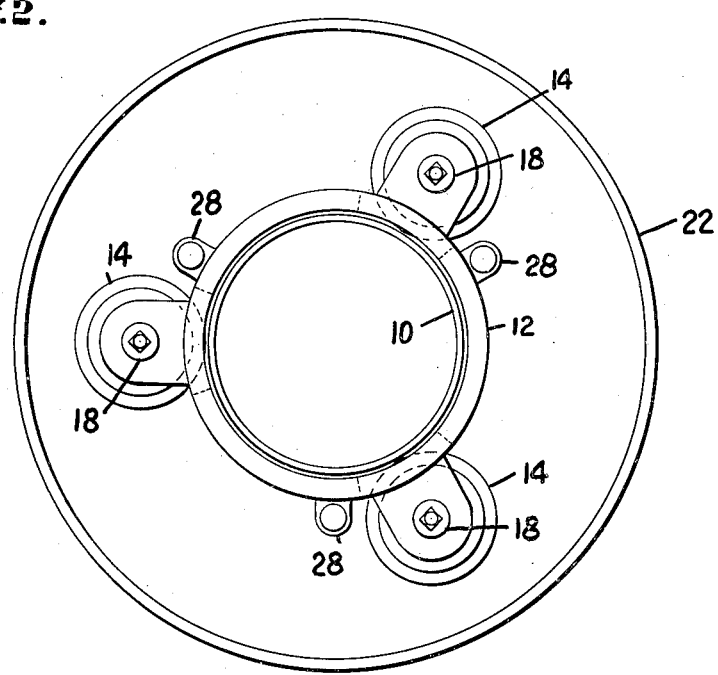
INVENTOR.
Otto E. Wolff
BY
Brown & Jones
ATTORNEYS.

Patented Mar. 28, 1939

2,152,518

UNITED STATES PATENT OFFICE 2,152,518

MOTION TRANSLATING MECHANISM

Otto E. Wolff, Arlington, Mass., assignor, by mesne assignments, to Polaroid Corporation, Dover, Del., a corporation of Delaware Application December 20, 1937, Serial No. 180,736

7 Claims. (Cl. 74—25)

This invention relates to a motion-translating mechanism and more specifically to a mechanism for translating a generally rotary motion into a linear motion.

In general it is an object of the invention to provide a device of the character described which will efficiently perform the purposes for which it is intended, which is simple and economical of construction, which can be expeditiously, conveniently and safely manipulated, and which can be readily manufactured and assembled.

Another object of the invention is to provide a mechanism which, as regards its function, is in the nature of a screw and nut but which has no thread; to provide an outer and an inner element, one of which is translated linearly with respect to the other when one is held fixed and the other is rotated about a mutual axis; to provide such a device where the inner element is a smooth cylinder; and to provide such a device one of said elements of which may carry with it, in a vertical direction, a considerable load.

Other objects of the invention will in part be obvious and will in part appear hereinafter.

The invention accordingly comprises the features of construction, combination of elements, and arrangement of parts which will be exemplified in the construction hereinafter set forth and the scope of the application of which will be indicated in the claims.

For a fuller understanding of the nature and objects of the invention, reference should be had to the following detailed description taken in connection with the accompanying drawing, in which:

Figure 1 is a side view, partly in section and partly in elevation, of a device embodying one form of the invention; and Fig. 2 is a view of the device shown in Fig. 1 as seen from below.

In the drawing, 10 denotes an arcuate surface extending around and lengthwise of a predetermined line. As shown, this is a portion of a circular cylinder. It may be of any suitable material having sufficient rigidity for the purposes in mind, but preferably of a hard and somewhat resilient material. Surrounding the cylinder 10 there is a cage or frame 12. Supported by the frame there are preferably a plurality, for example three, rotatable elements such as the rollers 14, the axis of each of which is at an angle to the axis of the tube 10 and in a plane parallel to the axis of tube 10. There may be anti-friction means such as the ball bearings 16 between the rollers and their axles 18. The rollers may be cylindrical, or the surfaces of the rollers may be so formed as to contact the cylinder over a predetermined area. The rotatable elements may be spherical and retain any suitable anti-friction retaining means.

Means may be provided for varying the angle between the axes of the rotatable elements and the axis of the cylinder 10. The elements 14 and their axles 18 may, for example, be mounted, as shown in Fig. 1 at 19, for rotation as a unit upon the surface of the cage 12. A set screw 20 may in each case serve to lock the axles 18 in any desired position.

The frame 12 may preferably be somewhat resilient so as to enable the rotatable elements more easily to pass over uneven portions of the relatively smooth cylinder 10. If the inner arcuate surface is not circular in cross-section, the frame 12 may be entirely resilient to follow the inner element.

A rim 22 extends out from frame 12 to act as a control wheel. It may be provided with an angular section 24 positioned inwardly of the rim 22 so as to contain a thrust bearing 26.

In certain cases the inner surface may have flattened portions or arcuate portions separated by somewhat angular corners. In that event, the rim 22 should be sufficiently large to surround the inner surface 10 and the rotatable elements may be resiliently positioned between the rim and the inner surface 10 so as always to press against that surface.

In operation, the control wheel or rim 22 is turned about the axis of the cylinder 10 or the line about which the inner surface extends. The inclination of the rollers or rotatable elements causes them to move along a helical path around the tube and raise or carry the frame 12 and any weight or object supported thereby along with them. In the foregoing, it is assumed that the inner surface 10 is fixed. Conversely, if the frame 12 is prevented from longitudinal displacement, the tube or inner surface will be moved longitudinally by the rotation of the wheel 22.

Frame 12 may be of one piece or it may comprise two pieces, that part which is associated with the rotatable elements being attached to the remainder or other piece by securing means, for example screws 28, preferably so positioned and spaced from the elements 14 as to connect the elements forming the cage 12 at points where irregularities in the surface 10 will cause a minimum displacement of the elements when the lower cage element is distorted.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. In a device of the character described, in combination, means providing a substantially cylindrical surface, an element surrounding said surface and rotatable about the axis of said cylinder, roller means affixed to said last-mentioned element and in contact with the surface of said cylinder and rotatable about an axis non-parallel to the axis of said cylinder, and means to hold said roller means firmly against said cylindrical surface, said element being supported in its position about said surface by said roller means.

2. In a device of the character described, in combination, means providing a substantially cylindrical surface, an element surrounding said surface and rotatable about the axis of said cylinder, roller means supporting the weight of and affixed to said last-mentioned element and in contact with the surface of said cylinder and rotatable about an axis nonparallel to the axis of said cylinder, and means to vary the angle between the axis of said cylinder and the axis of said last-mentioned rotatable means.

3. In combination, means providing a substantially cylindrical surface, a plurality of rotatable elements resiliently mounted to roll upon said surface, said elements rotating about axes nonparallel to the axis of said cylinder, and means surrounding said surface and rotatable about the axis of said cylinder for holding said first-mentioned rotatable means resiliently in contact with said surface.

4. In a device of the character described, the combination comprising means providing an arcuate surface, means rollable on said surface and rotatable about an axis lying in the plane which is tangent to said surface at a point of contact between said rollable means and said surface, said axis being at an angle with a material line lying in said plane and said surface, and mounting means causing said rolling means to bear continuously against said surface, said mounting means being rotatable about an axis non-parallel to the axis about which said rollable means is rotatable.

5. In a device of the character described, the combination comprising a substantially cylindrical element, a plurality of rollers in contact with the surface of said element and rotatable about axes non-parallel to the axis of said element, and a frame for said rollers rotatable about the axis of said cylindrical element and supported thereon solely by said rollers.

6. In a device of the character described, the combination comprising a substantially cylindrical element, a plurality of rollers in contact with the surface of said element and rotatable about axes non-parallel to the axis of said element, a frame for said rollers rotatable about the axis of said cylindrical element and supported thereon solely by said rollers, and means for resiliently pressing said rollers against the surface of said cylinder.

7. In combination, means providing a substantially cylindrical surface, a frame surrounding said surface and rotatable about the axis of the cylinder formed thereby, a plurality of rollable elements mounted in said frame and rollable upon said cylindrical surface and supporting said frame upon said surface, each of said elements being rotatable about an axis which is non-parallel to the axis of the cylinder formed by said surface whereby when said frame is rotated it is displaced along said surface in a direction substantially at right angles to its direction of rotation, said rollable elements being adjustably mounted in said frame whereby the angles formed by their axes with respect to the axis of the cylinder formed by said surface may be altered.

OTTO E. WOLFF.